(12) United States Patent
Beckett et al.

(10) Patent No.: US 7,385,938 B1
(45) Date of Patent: Jun. 10, 2008

(54) METHOD AND APPARATUS FOR ADJUSTING A NETWORK DEVICE CONFIGURATION CHANGE DISTRIBUTION SCHEDULE

(75) Inventors: William Beckett, Marlboro, NJ (US); Joseph Niederberger, Atlantic Highlands, NJ (US); Brian Freeman, Farmingdale, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 439 days.

(21) Appl. No.: 11/049,321

(22) Filed: Feb. 2, 2005

(51) Int. Cl.
*G01R 31/08* (2006.01)
(52) U.S. Cl. ........................ 370/254; 709/221
(58) Field of Classification Search ............... None
See application file for complete search history.

(56) References Cited

U.S. PATENT DOCUMENTS

| | | | |
|---|---|---|---|
| 6,700,870 B1 * | 3/2004 | Brandt et al. ............... | 370/230 |
| 7,042,843 B2 * | 5/2006 | Ni ............................... | 370/231 |
| 7,085,242 B2 * | 8/2006 | Liu ............................. | 370/254 |
| 2002/0124078 A1 * | 9/2002 | Conrad ....................... | 709/224 |
| 2005/0135356 A1 * | 6/2005 | Muthukrishnan et al. ... | 370/389 |
| 2006/0072508 A1 * | 4/2006 | Zou et al. .................... | 370/332 |

OTHER PUBLICATIONS

On-line article, MetaSolv Software, Inc., "Service Activation, MetaSolv Service Activation Data Sheet," MSLV/CDA/General/ProdSrvs_Area Detail, 2 pages, believe to have been posted on Sep. 2, 2004.
On-line article, Light Reading—Networking the Telecom Industry, "Orchestream Goes for Peanuts," 4 pages, Dec. 9, 2002.
On-line article, Syndesis—Making Your Network, "Wireline Netprovision Overview," 2 pages, believe to have been posted Sep. 2, 2004.

* cited by examiner

*Primary Examiner*—Phirin Sam

(57) ABSTRACT

The invention comprises a method and apparatus for adjusting a distribution schedule controlling distribution of network device configuration changes associated with a plurality of network devices. Specifically, the method comprises determining a distribution status of the distribution of network device configuration changes, comparing the distribution status to the distribution schedule, and adjusting the distribution schedule in response to a difference between the distribution schedule and the distribution status.

6 Claims, 5 Drawing Sheets

METHOD AND APPARATUS FOR ADJUSTING A NETWORK DEVICE CONFIGURATION CHANGE DISTRIBUTION SCHEDULE

FIELD OF THE INVENTION

The invention relates to the field of communications networks and, more specifically, to large-scale scheduling and distribution of network device configuration changes.

BACKGROUND OF THE INVENTION

In order to support continuous rises in the number of communication services users, service providers are constantly increasing network capacity. These increases in network capacity have resulted in the worldwide deployment of large numbers of network devices, as well as associated communication links connecting those network devices. Although the network devices are configured during initial deployment, situations often arise in which service providers must rapidly distribute configuration changes across large numbers of network devices in large-scale networks.

Since the application of network device configuration changes often impacts customer service, and service providers are typically obligated to adhere to service level assurance agreements regarding service availability and quality, configuration changes to network devices must be completed within rigorous timeframes. For example, in an Internet Protocol (IP) network having 500 network devices (each network device having an average of 100 interfaces), configuration changes to approximately 50,000 interfaces would need to be completed within a maintenance window of just a few hours.

One current method of effecting configuration changes on network devices includes developing specialized scripts, and then executing those scripts one network device at a time. Unfortunately, this method is expensive in terms of both service provider resources and customer impacts. The service provider resources (both software development and administrative) required to design, create, and execute the scripts on a device-by-device basis are potentially enormous. This is especially true if the configuration changes must be completed within a rigorous timeframe since such a situation would require a significant number of people to monitor the status of hundreds of running jobs. The scenario is exacerbated for network device reconfiguration performed in response to security threats or network device bugs, in which a large number of configuration changes may need to be performed with minimal notice for scheduling employees to develop, execute, and monitor a multitude of scripts.

In addition to being expensive in terms of service provider resources, the reconfiguration of a large network using scripts is expensive in terms of the time required to complete the reconfiguration of a large number of network devices, and the potential impact to the customers supported by those network devices. Furthermore, this method often fails to account for implementation timing, configuration change rollbacks, error correction, and other problems often encountered during the reconfiguration of network devices. This inability of the use of such scripts to account for these conditions further exacerbates the timing issue (i.e., completing network device configuration changes within the shortest possible timeframe in order to minimize impact to the customers).

As such, a need exists in the art for a method of adjusting a distribution schedule controlling distribution of network device configuration changes associated with a plurality of network devices.

SUMMARY OF THE INVENTION

In one embodiment, the invention comprises a method and apparatus for adjusting a distribution schedule controlling distribution of network device configuration changes associated with a plurality of network devices. Specifically, the method comprises determining a distribution status of the distribution of network device configuration changes, comparing the distribution status to the distribution schedule, and adjusting the distribution schedule in response to a difference between the distribution schedule and the distribution status.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of a service provider network comprising a plurality of Internet Protocol (IP) networks, each having a plurality of routers; however, the methodology of the invention can readily be applied to other network topologies. In one embodiment, the present invention provides a method for adjusting a distribution schedule controlling distribution of network device configuration changes associated with a plurality of network devices. By monitoring the status of network device configuration change distribution, and adjusting a network device configuration change distribution schedule based on deviations from that schedule, the invention enables the application of enormous numbers of network device configuration changes across global networks within short timeframes. In one embodiment, the network device configuration change distribution schedule is adaptable in response to runtime conditions such as slow communication links, slow processing times, and like conditions resulting in longer than expected network device configuration completion times.

Figure 1:
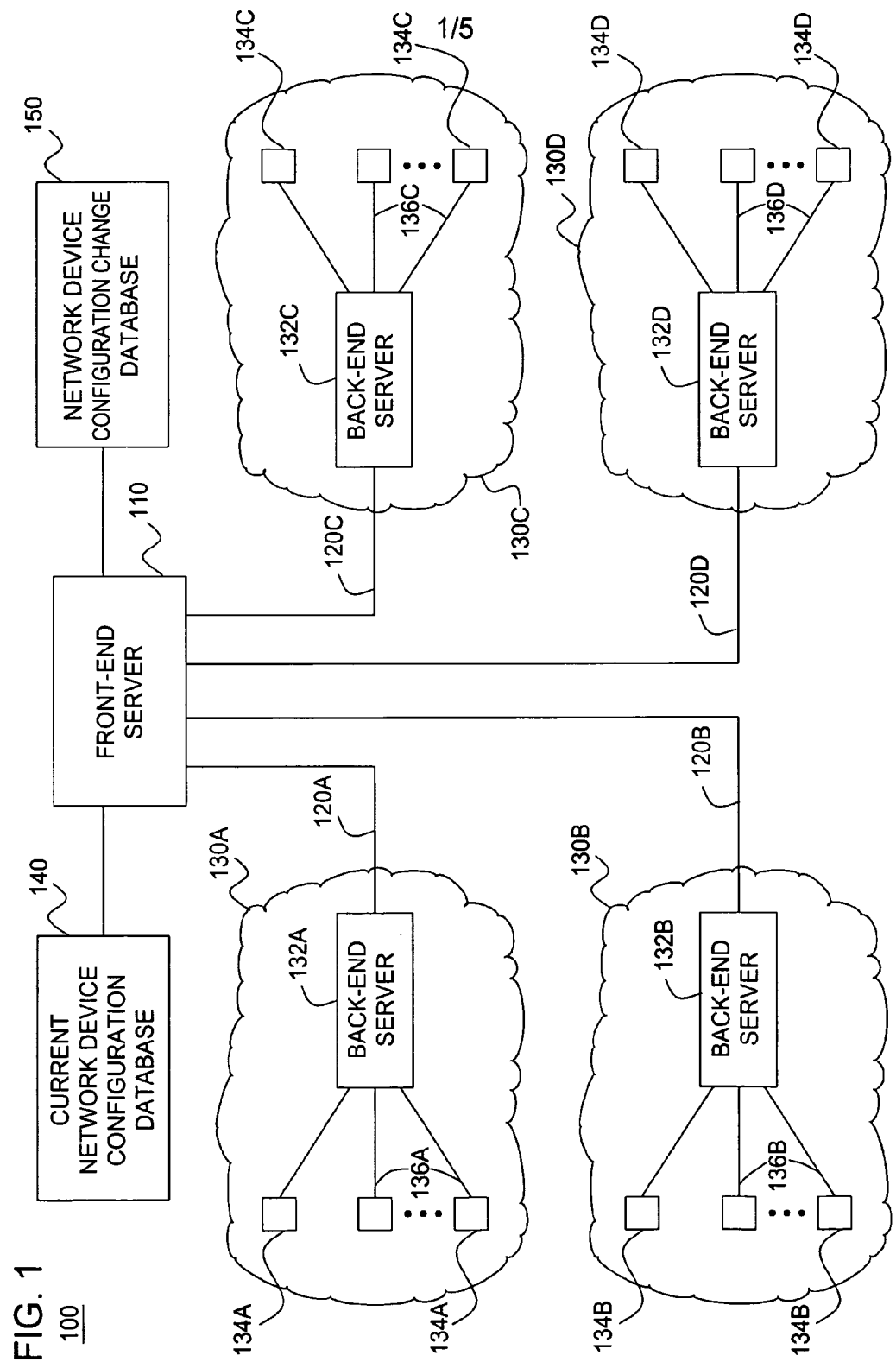
FIG. 1 depicts a high-level block diagram of a communication architecture including a front-end server and a plurality of back-end servers for distributing network device configuration changes.

FIG. 1 depicts a high-level block diagram of a communication architecture including a front-end server and a plurality of back-end servers for distributing network device configuration changes. Specifically, communications architecture 100 of FIG. 1 comprises a front-end server 110 and a plurality of communication networks 130A-D (collectively, communication networks 130) in communication via a respective plurality of communication links 120A-D (collectively, communication links 120).

The communication networks 130 comprise back-end servers 132A-D (collectively, back-end servers 132) and respective pluralities of network devices 134A-D (collectively, network devices 134) communicating via respective pluralities of communication links 136A-D (collectively, communication links 136). Although four communication networks 130 are depicted, network devices of fewer or more communication networks may be configured using the methodology of the present invention. In one embodiment, the communication networks 130 are geographically dispersed (e.g., communication network 130A located in Europe, communication network 130B located in the United States, communication network 130C located in South America, and communication network 130D located in Japan).

Although described herein as IP networks, each of the communication networks 130 may be any type of network comprising network devices capable of being configured. For example, each of the communication networks may be a frame relay (FR) network, an asynchronous transfer mode (ATM) network, an Ethernet network, an optical network, a time division multiplexing (TDM) network, and like networks having devices capable of being configured. As such, although described with respect to routers (within the context of an IP network), the methodologies of the present invention may be utilized for generating, scheduling, distributing, and effecting configuration changes on any configurable network devices, such as switches, cross-connect systems, add-drop multiplexers, UNIX devices, and like configurable network devices.

The back-end servers 132 receive and process network device configuration change requests from the front-end server 110. The processing of network device configuration change requests includes ensuring the validity of the network device configuration change requests, and resolving ambiguities in network device identification (ambiguous network device identifiers, network device IP addresses, and like forms of network device identification). In one embodiment, the back-end servers 132 send at least one error notification to front-end server 110 if network device identification ambiguity is not resolved.

The back-end servers 132 receive and process the network device configuration changes required in order to effect configuration changes on the respective pluralities of network devices 134. In one embodiment, the back-end servers 132 receive the network device configuration changes from at least one of the front-end server 110 and at least one remote database in communication with the back-end servers 132. In one embodiment, at least a portion of the network device configuration changes are pushed towards the back-end servers 132 by front-end server 110. In another embodiment, at least a portion of the network device configuration change files are received in response to a request by the back-end servers 132.

The back-end servers 132 communicate with each of the respective pluralities of network devices 134 via the respective communication links 136 using at least one protocol. In one embodiment, back-end servers 132 establish TELNET sessions with the corresponding pluralities of network devices. In one such embodiment, an entire byte-stream of configuration changes is transmitted towards a network device via a TELNET session with the network device. In another embodiment, the back-end servers 132 utilize Internet Control Message Protocol (ICMP) to communicate with the network devices 134.

In another embodiment, at least one of the back-end servers 132 comprises a Trivial File Transfer Protocol (TFTP) server for establishing TFTP sessions with individual network devices 134. The TFTP protocol is implemented on top of the Internet User Datagram Protocol (UDP), so it may be used to transfer files (e.g., network device configuration change files) between machines on different networks. Using TFTP sessions, the back-end servers 132 are able to transfer network device configuration changes to the network devices 134 with which the respective network device configuration changes are associated.

In one embodiment, each of the back-end servers 132 comprises at least one protocol listener port for detecting information received from front-end server 110. In one embodiment, each of the back-end servers 132 comprises a protocol interface for receiving information from and transmitting information towards the front-end server 110 using at least one protocol (such as Extensible Markup Language (XML), Common Management Information Protocol (CMIP), Simple Network Management Protocol (SNMP), and like protocols).

In this embodiment, each of the back-end servers 132 may comprise at least one application programming interface (API) for enabling a protocol interface to communicate with various processors and server components. In one embodiment, each of the back-end servers 132 comprises at least one module for creating objects (and managing the corresponding object lifetimes) required in order to transmit the network device configuration changes towards the network devices 134.

The configuration changes required for a network device, which may vary across devices, are determined by the front-end server 110. The network device configuration changes required for a given network device are identified by analyzing a current network device configuration. In one embodiment, the required network device configuration changes (and associated network device configuration change distribution schedule) are determined outside of the maintenance window. In another embodiment, the required network device configuration changes (and the associated network device configuration change distribution schedule) are determined within the maintenance window.

In one embodiment, the current network device configurations used for determining the necessity of effecting network device configuration changes are retrieved from front-end server 110. In another embodiment, the current network device configurations used for determining the necessity of effecting network device configuration changes are retrieved from at least one remote database (illustratively, current network device configuration database 140). In another embodiment, current network device configurations used to determine the necessity of effecting network device configuration changes are retrieved from the network devices via the respective back-end servers 132 to which each of the network devices 134 is connected.

In one embodiment, analysis of a current network device configuration is performed using at least one network device configuration template. A network device configuration template may correspond to a network device or at least one interface (or other component) of a network device. The network device configuration template is retrieved from at least one of the front-end server 110 (from a memory, database, and like components suitable for storing templates) and a remote database coupled to front-end server 110 (illustratively, current network device configuration database 140).

In one embodiment, generated network device configuration changes resulting from the analysis of a current network device configuration are written into to at least one network device configuration change file. A network device configuration change file may comprise at least one of a single network device configuration change associated with a network device, a plurality of network device configuration changes associated with a network device, and all network device configuration changes associated with a network device. In one embodiment, at least a portion of the network device configuration change files are generated on front-end server 110. In another embodiment, at least a portion of the network device configuration change files are generated on the back-end servers 132.

In one embodiment, at least a portion of the generated network device configuration change files are stored on the front-end server 110. In another embodiment, at least a portion of the generated network device configuration change files are transmitted towards and stored in at least one remote database (illustratively, network device configuration change database 150) coupled to the front-end server 110. In another embodiment, at least a portion of the network device configuration change files are transmitted towards and stored on the respective back-end servers 132.

In one embodiment, in order to distribute network device configuration changes, the front-end server 110 transmits the network device configuration changes towards the back-end servers 132. In another embodiment, in order to distribute network device configuration changes to the back-end servers 132, front-end server 110 transmits at least one network device configuration change message to each of the respective back-end servers 132. In this embodiment, the network device configuration change message may optionally include the network device configuration changes, or may instruct each of the respective back-end servers 132 to retrieve the network device configuration changes from at least one remote database (e.g., network device configuration change database 150).

The communication between front-end server 110 and the back-end servers 132 is facilitated using at least one protocol. In one embodiment, the protocol used to facilitate communication between the front-end server 110 and the back-end servers 132 is at least one of the Telecommunications Network (TELNET) Protocol, Transaction Language 1 (TL1), XML, SNMP, CMIP, and like communication protocols as known in the art.

In another embodiment, a distribution protocol is used to facilitate communication between front-end server 110 and the back-end servers 132. In one such embodiment, the distribution protocol is a modified form of an XML protocol in which the front-end server 110 does not spend compute cycles waiting for responses to messages transmitted towards the back-end servers 132. In other words, while a response message is received at some point in the future, the distribution protocol does not wait for a response (i.e., front-end server 110 does not maintain a state in which it is waiting for the response). Although described as a modified version of an XML protocol, the distribution protocol may be implemented as at least one of the communication protocols described above (i.e., TL1, CMIP, SNMP, TELNET, and like communication protocols).

In one embodiment, front-end server 110 supports capabilities for controlling configuration changes in the process of being executed against the network devices, for rolling back previously completed configuration changes, and for auditing the results of configuration changes. It should be noted that the capabilities described above may be implemented in various scopes, including all communication networks coupled to front-end server 110, a plurality of the communication networks coupled to front-end server 110, one communication network coupled to front-end server 110, a plurality of network devices across communication networks, a plurality of network devices within a communication network, at least one network device, at least one interface associated with a network device, and at least one thread associated with a network device.

As described above, the front-end server 110 generally performs network device transaction management, efficiency, and enhanced configuration functions. Some examples of network device transaction management functions include configuration rollback, configuration auditing, server state monitoring, automatic configuration failure recovery, and like functionality. Some examples of network device efficiency functions include support for multiple scheduling algorithms (and scheduler modeling), thread preemption and recovery, queue management and recovery, configuration load distribution error detection and correction, and like functionality. Some examples of enhanced configuration functions include support for numerous device types, operating system upgrade capabilities, template processors for creating patches, and like functions.

Figure 2:
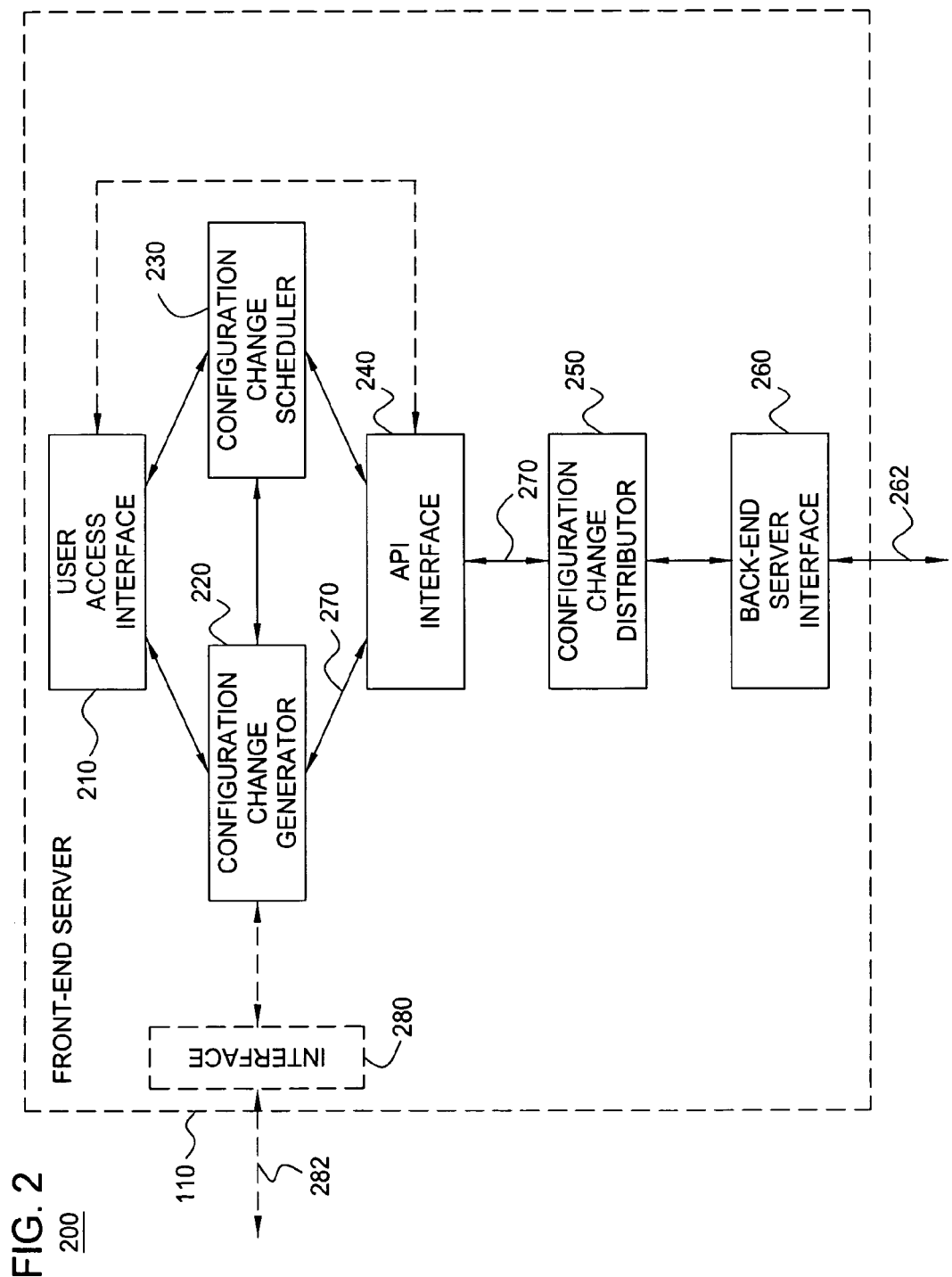
FIG. 2 depicts a high-level block diagram of a front-end server suitable for use in the communication architecture of FIG. 1.

FIG. 2 depicts a high-level block diagram of a front-end server suitable for use in the communication architecture of FIG. 1. Specifically, front-end server 110 comprises a user access interface (UAI) 210, a configuration change generator (CCG) 220, a configuration change scheduler (CCS) 230, an API interface 240, a configuration change distributor (CCD) 250, and a back-end server interface 260. The UAI 210 is coupled to CCG 220 and CCS 230. The CCG 220 and CCS 230 are coupled together, and are both coupled to the API interface 240. The API interface 240 is coupled to CCD 250. The CCD 250 is coupled to the back-end server interface 260. In one embodiment, the UAI 210 is optionally coupled directly to the API interface 240. In one embodiment, CCG 220 and CCS 230 are implemented within a single module. The component couplings described above are implemented using communication paths 270.

In one embodiment, the UAI 210 comprises at least one TELNET server for providing TELNET access into front-end server 110 from at least one user console. In this embodiment, UAI 210 supports a command line interface. In one embodiment, UAI 210 comprises at least one HTTP server for providing HTTP access into front-end server 110 from at least one user console. In this embodiment, UAI 210 supports a graphical user interface. In one embodiment, UAI 210 comprises both a TELNET server and a HTTP server for providing both command line and graphical user interface access into front-end server 110.

The UAI 210 enables a user to select the scope of the network device configuration (e.g., selecting entire communication networks, selecting individual network devices and network device interfaces, and the like). Furthermore, UAI 210 enables a user to view and modify a network device configuration change distribution schedule, and to obtain network device configuration change distribution status (including comparisons of distribution status to a distribution schedule). Similarly, UAI 210 enables users to access the CCD 250 via API interface 240.

The CCG 220 analyzes current network device configurations in order to determine if a particular network device requires configuration changes. In one embodiment, the CCG 220 optionally uses network device configuration templates in order to generate the required network device configuration changes. For each identified network device configuration change, at least one corresponding network device configuration change is created by CCG 220. In one embodiment, CCG 220 creates at least one network device configuration change file for each network device configuration change required for a particular network device.

The CCS 230 is coupled to CCG 220, API interface 240, and the CCD 250, and analyzes the network device configuration changes generated for each network device. Using the analysis of the network device configuration changes, CCS 230 determines a network device configuration change time associated with each of the network device configuration changes (based primarily on the scope of the configuration changes). The CCS 230 uses the network device configuration change times in order to create a network device configuration change distribution schedule.

In one embodiment, the CCS 230 interfaces with CCG 220 to obtain network device configuration change information (scope of the network device configuration changes) required for calculation of network device configuration change times associated with the respective network device configuration changes. In one such embodiment, CCS 230 determines the scope of network device configuration changes on-the-fly during creation of the network device reconfiguration changes. In another embodiment, CCS 230 obtains network device configuration change information from at least one remote database. In one such embodiment, the network device configuration changes are retrieved from the at least one remote database via at least one of back-end server interface 260 and, optionally, interface 280. In another embodiment, the CCS 230 retrieves the network device configuration changes from corresponding network device configuration change files.

Since network device design may vary significantly across the network devices (different network device types, sizes, and configurations, numbers of network device interfaces, and the like), the time required to configure each of the network devices may vary significantly. As such, scheduling the distribution of network device configuration changes may be quite difficult. The scheduling problem is further exacerbated by uncontrollable, dynamic variables involved during distribution and application of the configuration changes on each of the network devices (e.g., distribution network connectivity problems and network delays, varying network device processor speeds, configuration change failures and retries, and like dynamic variables).

Following the generation of the network device configuration changes, generation of the network device configuration change distribution schedule and initiation of distribution of the network device configuration changes, CCS 230 monitors and manages the network device configuration change distribution schedule, including effecting adjustments to the network device configuration change distribution schedule. As such, in one embodiment, the CCS 230 substantially performs the methodology depicted and described with respect to FIG. 4.

The API interface 240 comprises at least one API for enabling UAI 210 to communicate with CCD 250. In one embodiment, in which HTTP access to front-end server 110 is provided via UAI 210, API interface 240 comprises an XML API. In one embodiment, the API interface 240 comprises at least one other API for facilitating communication with CCD 250 and back-end server interface 260. Those skilled in the art will appreciate that numerous other APIs may be utilized as components of API interface 240.

The CCD 250, which is coupled to the API interface 240 and back-end server interface 260, determines the associations between network devices and backend servers. The CCD 250 uses the network device configuration change distribution schedule to organize distribution of the network device configuration changes (via back-end server interface 260) to the appropriate back-end servers 132 capable of accessing the respective network devices 134. Furthermore, CCD 250 performs thread scheduling, monitoring, and adjustment, implements security features, and comprises a reusable core infrastructure adaptable to support scheduling and distribution of network device configuration changes across any network comprising configurable network devices.

The back-end server interface 260 facilitates communication between front-end server 110 and the back-end servers 132 via communication link 262. Although one communication link 262 is depicted, additional communication links may be utilized to facilitate communication with the back-end servers 132. The front-end server 110 optionally comprises interface 280, which is optionally coupled to CCG 220. In one embodiment, in which at least one of the current network device configurations and the generated network device configuration changes are stored in a remote database, the interface 280 may facilitate communication between CCG 220 and the remote database.

Although not depicted, those skilled in the art will appreciate that the front-end server 110 may optionally include additional APIs, application servers, client servers, user interface tool suites, command line tool suites, TELNET servers, HTTP servers, protocol conversion modules, communication interfaces, and like components and modules not depicted or described with respect to FIG. 2. In one embodiment, at least a portion of the back-end server functionality described herein is implemented in the front-end server. In another embodiment, at least a portion of the front-end server functionality described herein is implemented in at least one of the back-end servers.

In one embodiment, in which the network devices are routers, the types of configuration changes that may be distributed include global router configuration changes, customer interface aligned configuration changes, and uplink aligned configuration changes. Such global router configuration changes include route map changes, policy map changes, SNMP community string changes, Authentication/Authorization/Accounting (AAA) setting changes, and like configuration changes. Such customer interface aligned configuration changes include access control list (ACL) changes, quality of service (QOS) changes, routing (static routing, External Border Gateway Protocol (eBGP)) changes, VPN routing and forwarding (VRF) changes, and like configuration changes. Such uplink aligned configuration changes include open shortest path first (OSPF) routing protocol changes, route reflector changes, internal Border Gateway Protocol (iBGP) changes, and like configuration changes.

Although described with respect to router configuration changes, those skilled in the art will appreciate that corresponding configuration changes may be scheduled, distributed towards, and ultimately implemented on various other types of network devices such as switches, cross-connect systems, and the like. Furthermore, although described with respect to router configuration changes, those skilled in the art will appreciate that using the methodology of the present invention, network device configuration change distribution schedules may be adjusted in order to minimize the time required to distribute network device configuration changes.

Figure 3:
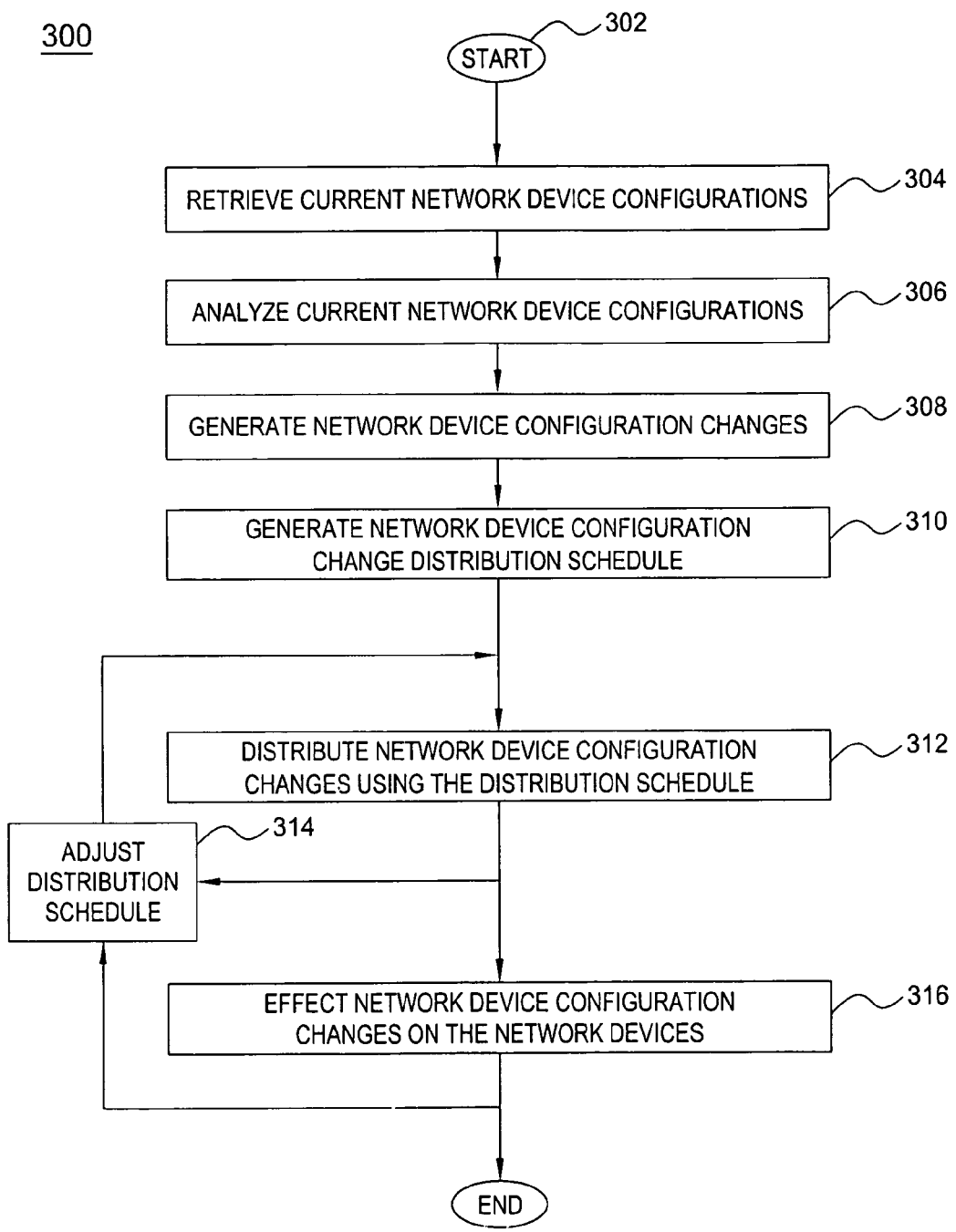
FIG. 3 depicts a flow diagram of a method according one embodiment of the invention.

FIG. 3 depicts a flow diagram of a method according one embodiment of the invention. Specifically, the method 300 of FIG. 3 comprises a method of generating and distributing network device configuration changes associated with a plurality of network devices. The method 300 comprises adjustment of a distribution schedule controlling distribution of the network device configuration changes. The method 300 is entered at step 302 and proceeds to step 304.

At step 304, the current network device configurations are retrieved. At step 306, the current network device configurations are analyzed in order to identify required network device configuration changes. At step 308, network device configuration changes are generated. At step 310, a network device configuration change distribution schedule (distribution schedule) is generated using the network device configuration changes. At step 312, the network device configuration changes are distributed using the network device configuration change distribution schedule.

At step 314, the network device configuration change distribution schedule is adjusted in response to identification of a difference between a distribution status and the distribution schedule. At step 316, regardless of adjustments to the distribution schedule, the network device configuration changes distributed in step 312 are received and processed in order to effect the network device configuration changes on the respective network devices. It should be noted that distribution of network device configuration changes and effecting of the network device configuration changes on the respective network devices may occur in parallel. Similarly, since the network device configuration change distribution schedule may be adjusted based upon a comparison of the distribution status to the distribution schedule, adjustment of the distribution schedule may be performed in parallel with both distribution of and effecting of the network device configuration changes.

Figure 4:
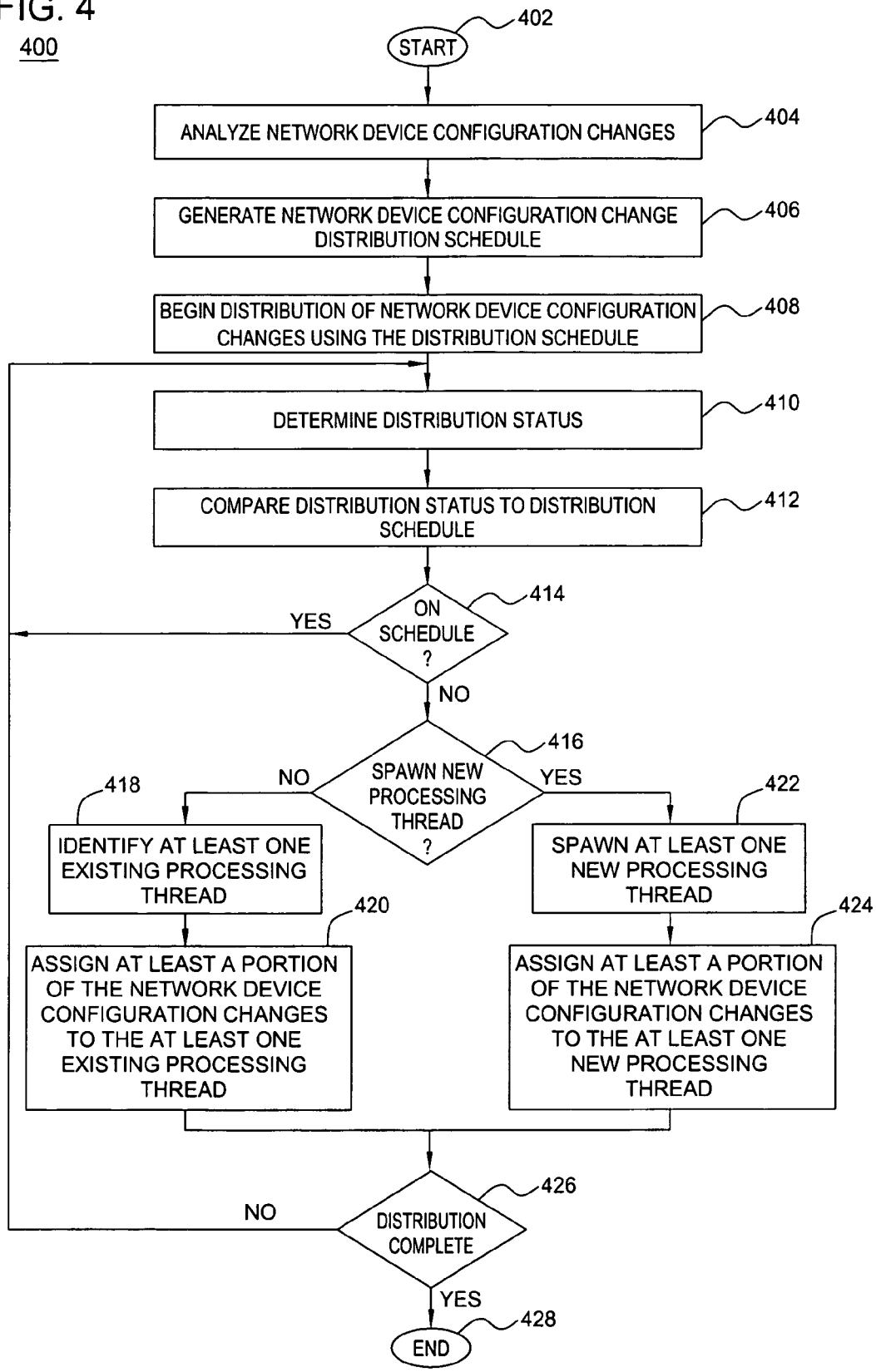
FIG. 4 depicts a flow diagram of a method according one embodiment of the invention.

FIG. 4 depicts a detailed flow diagram of a method according one embodiment of the invention. In particular, method 400 of FIG. 4 depicts a detailed version of a portion of the steps depicted and described with respect to method 300 of FIG. 3. As such, a single step depicted in FIG. 3 may correspond to multiple steps depicted in FIG. 4. Specifically, the method 400 of FIG. 4 comprises a method of adjusting a distribution schedule controlling distribution of network device configuration changes associated with a plurality of network devices. The method 400 is entered at step 402 and proceeds to step 404. At step 404, network device configuration changes are analyzed.

At step 406, a network device configuration change distribution schedule (distribution schedule) is generated using the analysis of the network device configuration changes. In one embodiment, the distribution schedule comprises at least one assignment of at least one network device configuration change to at least one processing thread. As such, in one embodiment, the distribution schedule comprises a list of network devices (and associated network device configuration changes) that are grouped by the respective processing threads in which network device configuration change distribution processing is scheduled to be performed.

For example, ten configuration changes associated with a first network device and twenty configuration changes associated with a second network device may be assigned to a first processing thread. Similarly, thirty configuration changes associated with a third network device may be assigned to a second processing thread. In other words, depending upon the scope of the configuration changes (and the associated network device configuration change distribution times), load-balancing is performed across a plurality of processing threads in order to minimize network device configuration change distribution time.

At step 408, distribution of network device configuration changes according to the distribution schedule is initiated. At step 410, a distribution status is determined. At step 412, the distribution status is compared to the distribution schedule. The distribution status is essentially a measure of completeness of distribution processing associated with a particular processing thread. As such, in one embodiment, comparison of the distribution status to the distribution schedule comprises comparing a distribution status time to a distribution schedule time.

In continuation of the example above, assume that the fourth network device configuration change associated with the first network device has just finished processing by the first processing thread, and that processing of the fifth network device configuration change is about to begin processing. Further assume that the first processing thread has been processing for one minute. As such, the associated distribution status provides an indication that, after one minute of processing time, the processing required to distribute the first four network device configuration changes associated with first network device is complete.

This distribution status is compared to the distribution schedule. Thus, further assume that according to the distribution schedule, the processing of the fourth network device configuration change associated with the first network device should have been completed after twenty seconds. A comparison of the distribution status (sixty seconds) to the distribution schedule (twenty seconds) results in a determination that the first processing thread is forty seconds behind schedule.

At step 414, determine if the network device configuration change distribution is on-schedule. In one embodiment, a determination that the network device configuration change distribution is on-schedule requires a determination that the distribution status and the distribution schedule are substantially the same. In another embodiment, determination that network device configuration change distribution is on-schedule requires a determination that the difference between the distribution status and the distribution schedule does not exceed a threshold value. In one embodiment, in which comparison of the distribution status to the distribution schedule comprises comparing a distribution status time to a distribution schedule time, determine if the distribution status time and the distribution schedule time are substantially the same (or the difference between the distribution status time and the distribution schedule time does not exceed a threshold value).

In continuation of the example above, a comparison of the distribution status (distribution status time of sixty seconds) to the distribution schedule (distribution schedule time of twenty seconds) results in a determination that the first processing thread is not on schedule but, rather, is forty seconds behind schedule. Assuming that a threshold value of twenty-five seconds was set, the difference between the distribution status and distribution schedule of the first processing thread (forty seconds) exceeds the threshold value by fifteen seconds. As such, at least a portion of the network device configuration changes remaining (unprocessed) in the first processing thread are reassigned to at least one of the second processing thread and at least one new processing thread.

If the distribution status and the distribution schedule are substantially the same (or minimally, the difference between the distribution status and the distribution schedule does not fall outside of a threshold value), the distribution of network device configuration changes is on-schedule, and method 400 proceeds to step 410. If the distribution status and the distribution schedule are not substantially the same, the distribution of network device configuration changes is not on-schedule, and method 400 proceeds to step 416.

At step 416, determine whether a new processing thread should be spawned in order to adjust the distribution schedule. If a new processing thread is not spawned, the method 400 proceeds to step 418. If a new processing thread is spawned, the method 400 proceeds to step 422. In one embodiment, the decision to use an existing processing thread or spawn at least one new processing thread is based on a comparison of distribution status to distribution schedule for each of the existing processing threads.

At step 418, at least one existing processing thread is identified. In one embodiment, the identification of the at least one existing processing thread is performed using a comparison of the distribution status to the distribution schedule. In one embodiment, the comparison of the distribution status to the distribution schedule is performed for each of the existing processing threads. In one such embodiment, existing processing threads that are ahead-of-schedule are given priority over existing processing threads that are closest to being on schedule, which are, in turn, given priority over existing processing threads that are further from being on-schedule.

At step 420, at least a portion of the network device configuration changes are assigned to the at least one existing processing thread. In one embodiment, at least a portion of the network device configuration changes are reassigned from a behind-schedule processing thread to at least one ahead-of-schedule existing processing thread. In one embodiment, at least a portion of the network device configuration changes from one behind-schedule processing thread are assigned to the at least one existing processing thread. In another embodiment, at least a portion of network device configuration changes from a plurality of behind-schedule processing threads are assigned to the at least one existing processing thread.

At step 422, at least one new processing thread is spawned. At step 424, at least a portion of the network device configuration changes are assigned from the behind-schedule processing thread to the at least one new processing thread spawned at step 422. In one embodiment, at least a portion of the network device configuration changes from one behind-schedule processing thread are assigned to the at least one new processing thread. In another embodiment, at least a portion of network device configuration changes from a plurality of behind-schedule processing threads are assigned to the at least one new processing thread.

At step 426, determine if the network device configuration change distribution processing is complete. If the distribution processing required to distribute the network device configuration changes is not complete, method 400 proceeds to step 410 to determine the distribution status. If the distribution processing required to distribute the network device configuration changes is complete, method 400 proceeds to step 428 where the method 400 ends.

Figure 5:
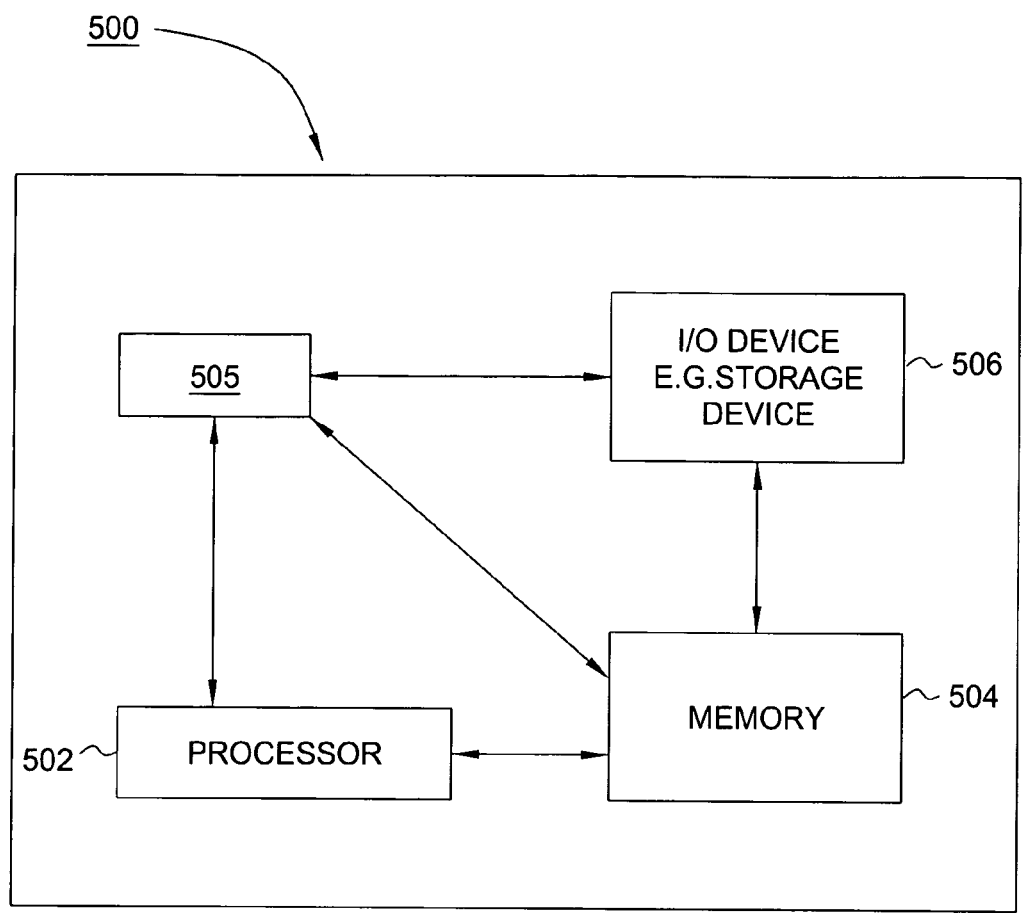
FIG. 5 depicts a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a network device configuration change distribution schedule adjustment module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present network device configuration change distribution schedule adjustment module or process 505 can be loaded into memory 504 and executed by processor 502 to implement the functions as discussed above. As such, the present network device configuration change distribution schedule adjustment process 505 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for adjusting a distribution schedule controlling distribution of network device configuration changes associated with a plurality of network devices, comprising:
   determining a distribution status of said distribution of network device configuration changes;
   comparing said distribution status to said distribution schedule, wherein said comparison of said distribution status to said distribution schedule comprises comparing a distribution status time to a distribution schedule time, wherein a difference between said distribution status time and said distribution schedule time exceeds at least one threshold value, wherein said at least one threshold value comprises at least one of a length of time and a percentage of said distribution schedule time; and
   adjusting said distribution schedule in response to said difference between said distribution schedule and said distribution status.

2. A method for adjusting a distribution schedule controlling distribution of network device configuration changes associated with a plurality of network devices, comprising:
   determining a distribution status of said distribution of network device configuration changes;
   comparing said distribution status to said distribution schedule; and
   adjusting said distribution schedule in response to a difference between said distribution schedule and said distribution status, wherein said adjustment of said distribution schedule comprises:
   identifying at least one existing processing thread; and
   assigning at least a portion of said network device configuration changes associated with at least one of said plurality of network devices to at least one existing processing thread.

3. The method of claim 2, wherein said at least one existing processing thread is ahead of schedule.

4. A method for adjusting a distribution schedule controlling distribution of network device configuration changes associated with a plurality of network devices, comprising:
   determining a distribution status of said distribution of network device configuration changes;

comparing said distribution status to said distribution schedule; and adjusting said distribution schedule in response to a difference between said distribution schedule and said distribution status, wherein said adjustment of said distribution schedule comprises:

spawning at least one new processing thread; and assigning at least a portion of said network device configuration changes associated with at least one of said plurality of network devices to said at least one new processing thread.

5. A computer readable medium storing a software program, that, when executed by a computer, causes the computer to perform a method, comprising:

determining a distribution status of distribution of network device configuration changes;

comparing said distribution status to said distribution schedule; and adjusting said distribution schedule in response to a difference between said distribution schedule and said distribution status, wherein said adjustment of said distribution schedule comprises:

identifying at least one existing processing thread; and assigning at least a portion of said network device configuration changes associated with at least one of said plurality of network devices to at least one existing processing thread.

6. A computer readable medium storing a software program, that, when executed by a computer, causes the computer to perform a method, comprising:

determining a distribution status of distribution of network device configuration changes;

comparing said distribution status to said distribution schedule; and adjusting said distribution schedule in response to a difference between said distribution schedule and said distribution status, wherein said adjustment of said distribution schedule comprises:

spawning at least one new processing thread; and assigning at least a portion of said network device configuration changes associated with at least one of said plurality of network devices to said at least one new processing thread.

* * * * *